United States Patent
Slayne et al.

(10) Patent No.: US 10,094,426 B2
(45) Date of Patent: Oct. 9, 2018

(54) TOLERANCE RING WITH DIVIDED TORQUE SLIP

(71) Applicant: Saint-Gobain Performance Plastics Rencol Limited, Coventry (GB)

(72) Inventors: Andrew R. Slayne, Frampton Cotterell (GB); Llewelyn Pickering, Clydach Monmouthshire (GB)

(73) Assignee: SAINT-GOBAIN PERFORMANCE PLASTICS RENCOL LIMITED, Coventry (GB)

( * ) Notice: Subject to any disclaimer, the term of this patent is extended or adjusted under 35 U.S.C. 154(b) by 581 days.

(21) Appl. No.: 14/314,997

(22) Filed: Jun. 25, 2014

(65) Prior Publication Data

US 2015/0001025 A1    Jan. 1, 2015

Related U.S. Application Data

(60) Provisional application No. 61/840,451, filed on Jun. 27, 2013.

(51) Int. Cl.
  *F16D 1/08* (2006.01)
  *F16D 7/02* (2006.01)

(52) U.S. Cl.
  CPC .......... *F16D 7/021* (2013.01); *F16D 1/0835* (2013.01)

(58) Field of Classification Search
  CPC ...... F16D 7/021; F16D 1/0835; F16D 1/0841; F16D 41/066; F16D 41/067;
  (Continued)

(56) References Cited

U.S. PATENT DOCUMENTS

| 3,142,887 | A | * | 8/1964 | Hulck | ................... B21D 53/16 29/417 |
| 3,353,639 | A |   | 11/1967 | Andriussi | |

(Continued)

FOREIGN PATENT DOCUMENTS

| EP | 2532907 A2 | 12/2012 |
| JP | 2002106554 A | 4/2002 |

(Continued)

OTHER PUBLICATIONS

International Search Report for PCT/EP2014/063737 dated Oct. 14, 2014, 1 page.

*Primary Examiner* — Joshua J Michener
*Assistant Examiner* — Kyle J. Walraed-Sullivan
(74) *Attorney, Agent, or Firm* — Abel Law Group, LLP; Chi Suk Kim

(57) ABSTRACT

A tolerance ring is adapted to be deployed between inner and outer components. The tolerance ring includes a generally cylindrical body. The sidewall can include an undeformed portion. The sidewall can further include a plurality of wave structures. The wave structures can protrude radially from the undeformed portion. Some or all wave structures can protrude inwardly or can protrude outwardly. Furthermore, the tolerance ring when placed in an assembly having an inner component and an outer component can have a first torque break-point $T_1$ in a first rotational direction. A torque break point for an assembly comprising an inner component, an outer component, and a tolerance ring is the torque at which slippage occurs.

20 Claims, 6 Drawing Sheets

(58) Field of Classification Search
CPC ......... F16D 2001/062; Y10T 403/7061; Y10T 403/7047; F16C 2370/12; F16C 27/04; F16C 35/077; F16C 7/021; F16C 2001/062; G11B 5/4813
USPC ........................................................ 403/372
See application file for complete search history.

(56) References Cited

U.S. PATENT DOCUMENTS

| | | | |
|---|---|---|---|
| 3,838,928 | A | 10/1974 | Blaurock et al. |
| 3,854,561 | A | 12/1974 | Conde |
| 4,236,619 | A | 12/1980 | Kuroda |
| 4,981,390 | A | 1/1991 | Cramer, Jr. et al. |
| 4,989,705 | A * | 2/1991 | Kashio ................. F16D 41/067 192/41 R |
| 5,595,272 | A | 1/1997 | Zhou |
| 6,056,517 | A | 5/2000 | Obrist et al. |
| 6,333,839 | B1 * | 12/2001 | Misso .................... F16C 27/04 360/265.7 |
| 6,655,847 | B2 | 12/2003 | Obara et al. |
| 6,951,481 | B2 * | 10/2005 | Dykstra ............... H01R 9/0521 439/578 |
| 2005/0225903 | A1 * | 10/2005 | Sprankle ................ F16C 27/00 360/264.3 |
| 2008/0028591 | A1 * | 2/2008 | Hughes ................. F16D 1/0817 29/436 |
| 2008/0043374 | A1 * | 2/2008 | Hanrahan ............... F16C 27/00 360/265.6 |
| 2008/0043375 | A1 * | 2/2008 | Hanrahan ............... F16C 27/00 360/265.6 |
| 2008/0060905 | A1 * | 3/2008 | Snadden ................ F16B 21/20 192/213.2 |
| 2008/0062572 | A1 * | 3/2008 | Hanrahan ............... F16C 27/00 360/265.2 |
| 2008/0199254 | A1 * | 8/2008 | Baker .................... F16C 11/04 403/372 |
| 2008/0267693 | A1 * | 10/2008 | Court .................... F16C 11/045 403/14 |
| 2014/0147199 | A1 * | 5/2014 | Tajima ................... F16C 27/02 403/371 |
| 2014/0205374 | A1 * | 7/2014 | Nias ......................... F16D 9/06 403/367 |

FOREIGN PATENT DOCUMENTS

| | | |
|---|---|---|
| JP | 2005114025 A | 4/2005 |
| JP | 2006038039 | 2/2006 |
| JP | 2008032193 A | 2/2008 |

* cited by examiner

TOLERANCE RING WITH DIVIDED TORQUE SLIP

CROSS-REFERENCE TO RELATED APPLICATION(S)

This application claims priority to U.S. Patent Application No. 61/840,451 entitled "Tolerance Ring with Divided Torque Slip," by Andrew R. Slayne and Llewelyn Pickering, filed Jun. 27, 2013, which application is assigned to the current assignees hereof and incorporated herein by reference in its entirety.

BACKGROUND

Field of the Disclosure

The present disclosure is directed to tolerance rings, particularly to tolerance rings to provide a torque coupling affect between components.

Description of the Related Art

The present disclosure relates to tolerance rings and assemblies, wherein a tolerance ring provides an interference fit between components of an assembly.

Improved engineering techniques have resulted in the need for greater accuracy of machine parts, raising manufacturing costs. Very close tolerances are required where press fits, splines, pins or keyways are employed to transmit torque in applications such as pulleys, flywheels, rotors, or drive shafts, or to prevent relative motions between parts, such as stators, main frames, lower frames, and compressor housings.

Tolerance rings may be used to provide an interference fit between parts required to transmit torque. Tolerance rings provide an efficient means of providing an interference fit between parts that may not be machined to exact dimensions. Tolerance rings have a number of other potential advantages, such as compensating for different linear coefficients of expansion between the parts, allowing rapid apparatus assembly, and durability.

A tolerance ring generally comprises a strip of resilient material, for example a metal such as spring steel, the ends of which are brought together to form a ring. A band of protrusions extend radially outwards from the ring, and/or radially inwards towards the center of the ring. Usually, the protrusions are formations, possibly regular formations, such as corrugations, ridges or waves.

When the ring is located in the annular space between, for example, a bearing and a bore in a housing in which the bearing is located, the protrusions are compressed. Each protrusion acts as a spring and exerts a radial force against the bearing and the surface of the bore, providing an interference fit between the bearing and the housing. A sliding shaft can be free to move axially through the bearing while the bearing remains securely installed within the housing.

Although tolerance rings usually comprise a strip of resilient material that is curved to allow the easy formation of a ring by overlapping the ends of the strip, a tolerance ring may also be manufactured as an annular band. The term "tolerance ring" as used hereafter includes both types of tolerance ring.

Accordingly, the industry continues to need improvements in tolerance rings, particularly tolerance rings installed within steering assemblies.

BRIEF DESCRIPTION OF THE DRAWINGS

The present disclosure can be better understood, and its numerous features and advantages made apparent to those skilled in the art by referencing the accompanying drawings.

The use of the same reference symbols in different drawings indicates similar or identical items.

DETAILED DESCRIPTION

Figure 1A:
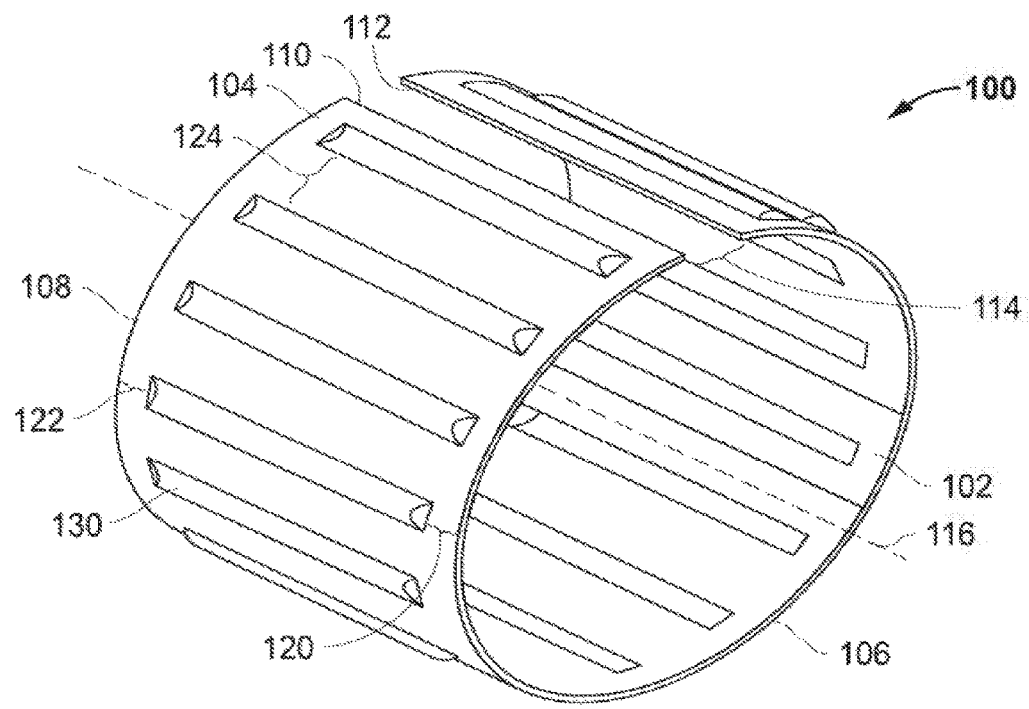
FIG. 1A includes a perspective view of a tolerance ring in accordance with a first embodiment.

The following description is directed to tolerance rings, and in on instance, to tolerance rings that can be installed within a steering assembly between a bushing for a sliding shaft and a housing. In one aspect, a tolerance ring is adapted to be deployed between inner and outer components. The tolerance ring includes a generally cylindrical body. The cylindrical body has a central axis. The cylindrical body can further include a sidewall that defines a first axial end and a second axial end. The sidewall can include an undeformed portion. Undeformed portions of the sidewall are regions free of protrusions, wave, extension, notches, openings, and other surface deformations. However, undeformed region allow for the portion to align with the curvature of the cylindrical body.

The sidewall can further include a plurality of wave structures. The wave structures can protrude radially from the undeformed portion. Some or all wave structures can protrude inwardly, i.e. the apex of the wave structures is closer to the central axis than the undeformed portion. In another embodiment, some or all wave structures can protrude outwardly, i.e. the apex of the wave structures is farther to the central axis than the undeformed portion.

Furthermore, the tolerance ring when placed in an assembly having an inner component and an outer component can have a first torque break-point $T_1$ in a first rotational direction. A torque break point for an assembly comprising an inner component, an outer component, and a tolerance ring is the torque at which slippage occurs.

Torque slippage can be measured similar to or as described for steering devices in European Commission Directive for Automotives 95/56/EC (Nov. 8, 1995). In general, a torque break point can be determined with a test assembly comprising an inner component having a central axis, an outer component, wherein the outer component is held static, i.e. unrotatable about the central axis, and the inner component being rotatable around the central axis. A tolerance ring is placed between the inner and outer component and aligned to share the central axis with the inner component. Torque is applied to the inner component and the torque break point is defined as the necessary torque for slippage of the inner component to occur. The torque break point can be determined in a clockwise as well as a counter-clockwise rotation.

According to embodiments, the tolerance ring when placed in an assembly can have a second torque break point $T_2$ in a second rotational direction opposite to the first rotational direction. In a first aspect, the ratio of $T_1/T_2>1$, i.e. the torque needed for clockwise rotation is different from the torque needed for counter-clockwise rotation.

In a second aspect, an assembly can include an outer component. The outer component can include a bore. The assembly can further include an inner component disposed within the bore. The outer and inner component can share a common central axis. The assembly can further include a tolerance ring mounted between the inner component and the outer component. The tolerance ring includes a generally cylindrical body. The generally cylindrical body has a central axis, which aligns with the central axis of the inner and outer component. The tolerance ring can further include a sidewall that defines a first axial end and a second axial end. The sidewall can include an undeformed portion. The sidewall can further include a plurality of wave structures protruding radially from the undeformed portion. The wave structures can protrude radially inward or outward, or even alternate, i.e. some protrude inward and some outward. The assembly can have a first torque break-point $T_1$ between the inner component and the outer component in a first rotational direction. The assembly has further a second torque break point $T_2$ in a second rotational direction opposite to the first rotational direction. The ratio of $T_1/T_2>1$, i.e., the torsional moment needed for clockwise rotation is different than the torsional moment for counter-clockwise rotation.

Figure 1B:
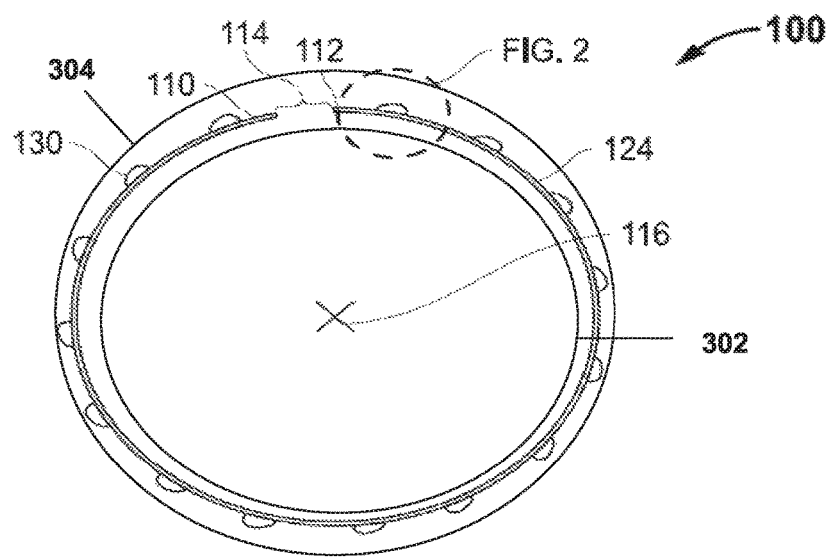
FIG. 1B includes a cross-sectional view of a tolerance ring in accordance with the first embodiment.

Referring now to FIGS. 1A and 1B, an exemplary tolerance ring is illustrated and is generally designated 100. As depicted in FIG. 1, the tolerance ring 100 can include a generally cylindrical body 102 having a generally cylindrical undeformed sidewall 104. The sidewall 104 can include a top 106 located at a first axial end and a bottom 108 located at a second axial end, opposite to the first axial end. Further, the sidewall 104 can include a first end 110 and a second end 112. Moreover, a gap 114 can be established between the first end 110 and the second end 112 of the sidewall 104. The gap 114 can extend completely through the sidewall 104 in order to form a split in the sidewall 104 of the tolerance ring 100. As illustrated in FIG. 1A, the tolerance ring 100 can include a center axis 116.

The sidewall 104 of the tolerance ring 100 can include an upper undeformed band 120 near, or adjacent to, the top 106 of the sidewall 104. The sidewall 104 can also include a lower undeformed band 122 near, or adjacent to, the bottom 108 of the sidewall 104 opposite the upper unformed band 120. Undeformed sections 124 can extend axially along the length of the sidewall 104 between, and extending from, the undeformed bands 120 and 122.

As illustrated in FIGS. 1A and 1B, the tolerance ring 100 can include a plurality of wave structures 130 formed in the sidewall 104. The wave structures 130 can protrude radially outward, or inward (not shown), from the sidewall 104 away from, or toward, the central axis 116 of the tolerance ring 100.

Each wave structure 130 may be connected only to the undeformed sections 124 such that the portion near the undeformed bands 120 and 122 of wave structures 130 are open. In another embodiment, the wave structure 130 may be connected to the undeformed sections 124 and the undeformed bands 120 and 122. As shown in FIG. 1B, each undeformed section 124 is located between adjacent wave structures 130 and each wave structure 130 is located between adjacent unformed sections 124 so the wave structures 130 and unformed sections 124 alternate around a circumference of the sidewall 104.

As depicted in FIG. 1A, the tolerance ring 100 can include one row, or band, of wave structures. In other embodiments (not shown), the tolerance ring can include two rows, or bands, of wave structures; three rows, or bands, of wave structures; etc. Further, a total number of wave structures, $N_{WS}$, in each row can be ≥3, such as ≥4, ≥5, ≥6, ≥7, ≥8, or ≥9. Further, $N_{WS}$≤30, ≤25, ≤20, or ≤15. $N_{WS}$ can be within a range between and including any of the $N_{WS}$ values above. In a particular embodiment, as shown in FIGS. 1A and 1B, $N_{WS}$ can be 15.

Figure 2:
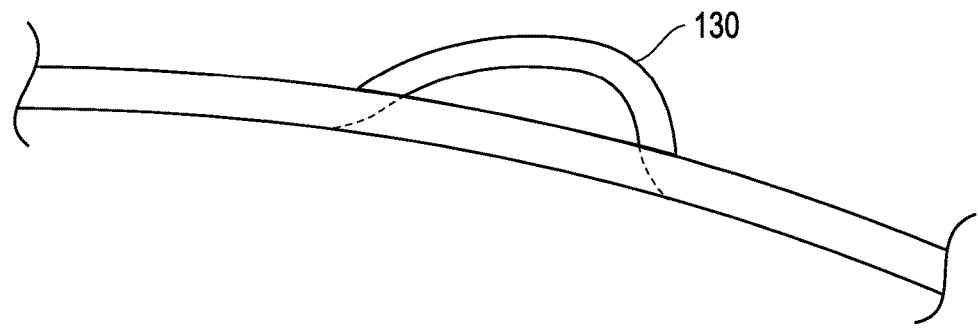
FIG. 2 includes a partial cross-sectional view of a wave structure of a tolerance ring in accordance with the first embodiment.
Figure 3A:
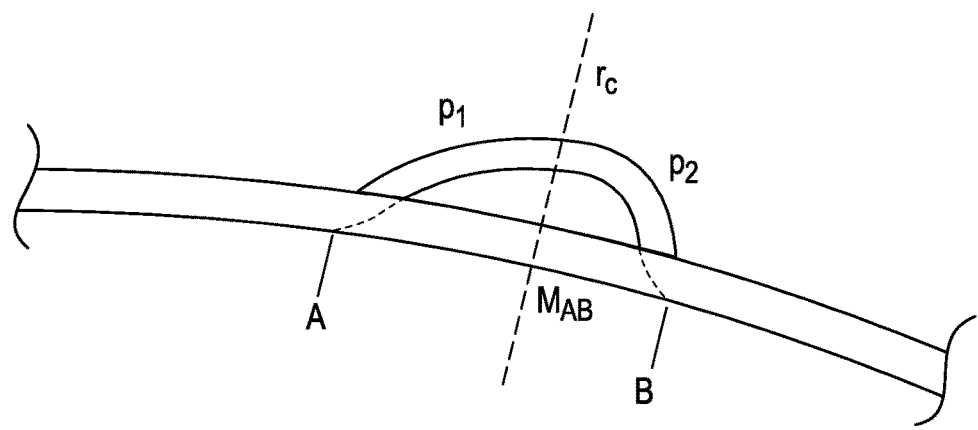
FIGS. 3A and 3B include annotated partial cross-sectional views of a wave structure of a tolerance ring in accordance with the first embodiment.

Referring to FIG. 2 displaying a partial cross-sectional view of the tolerance ring 100 of one wave structure 130. The wave structure 130 can have an asymmetric profile. As shown in FIG. 3A, the wave structure 130 spans over an undeformed section |AB|, i.e. the section restricted by points A and B along the undeformed band in FIG. 3A of the tolerance ring. The section |AB| includes a midpoint $M_{AB}$. A plane $r_c$ extending from the central axis 116 and through midpoint $M_{AB}$ bisects the wave structure 130 into two portions $p_1$ and $p_2$ as shown in FIG. 3A. Portion $p_1$ extends from point A to point D; portion $p_2$ extends from point D to point B.

Figure 3B:
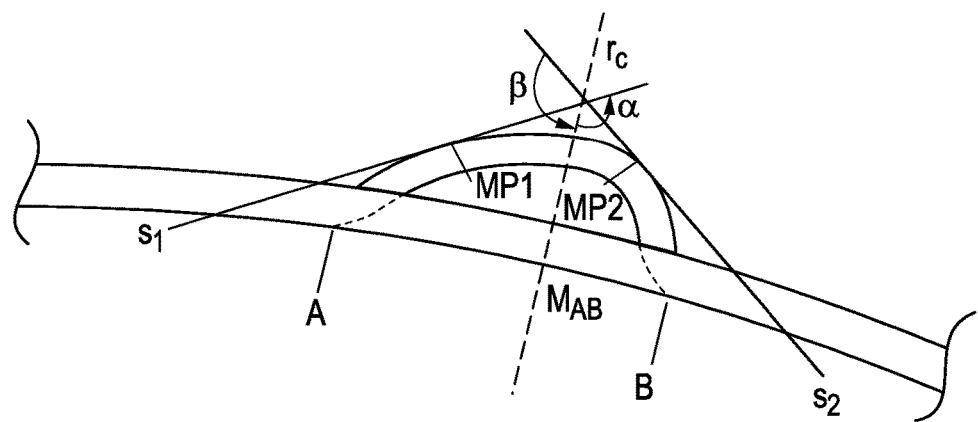

Referring to FIG. 3B, portion $p_1$ has a midpoint $MP_1$ located halfway between |AD| and portion $p_2$ has a midpoint $MP_2$ located halfway between |DB|, respectively. FIG. 3B discloses the tangential slope of $s_1$ of portion $p_1$ and touching $MP_1$. The slope $s_1$ can be determined by the angle $\alpha$ between $s_1$ and $r_c$. The absolute slope value $|s_1|=\tan(\alpha-90°)$. Likewise, portion $p_2$ has a tangential slope $s_2$ at midpoint $MP_2$ which cuts $r_c$ at an angle $\beta$. Accordingly, the absolute slope value $|s_2|=\tan(\alpha-90°)$. In embodiments, $|s_1|$ is different from $|s_2|$.

In one embodiment as shown in FIG. 3B, $|s_2|>|s_1|$. In a further embodiment, the ratio of $|s_2|/|s_1|$ is greater than 1, such as greater than 1.1, greater than 1.2, greater than 1.4, greater than 1.8, greater than 2.0, greater than 2.5, greater than 3.0, greater than 4.0, greater than 5.0, or greater than 10. In another embodiment, the ratio $|s_2|/|s_1|$ is less than 10.5, such as less than 5.5, less than 4.5, less than 3.5, less than 2.8, less than 2.3, less than 2.1, less than 1.9, less than 1.7, less than 1.5, or less than 1.3. In yet another embodiment, the ratio of $|s_2|/|s_1|$ can range from 1.1 to 3.5, such as from 1.4 to 3.0.

Figure 4A:
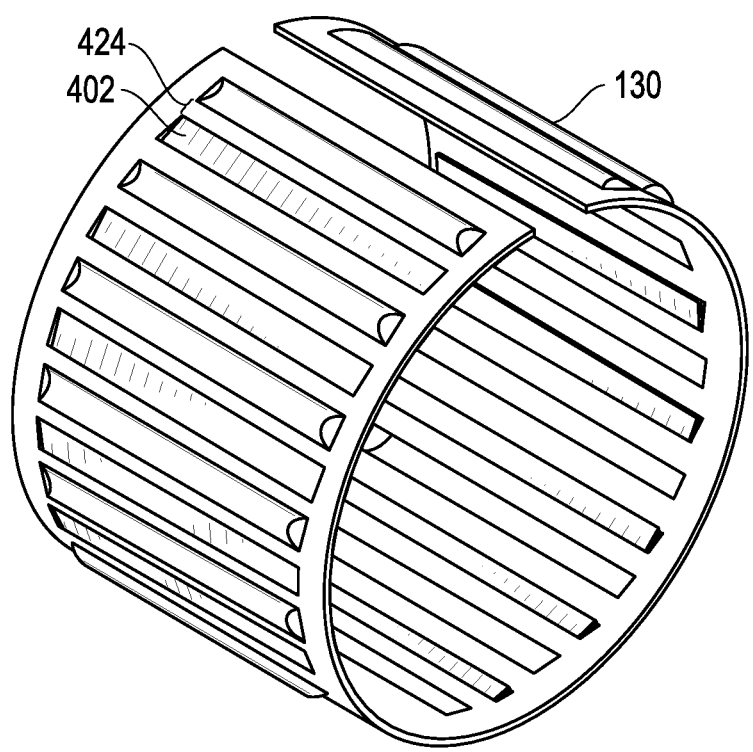
FIG. 4A includes a perspective view of a tolerance ring in accordance with a second embodiment.
Figure 4B:
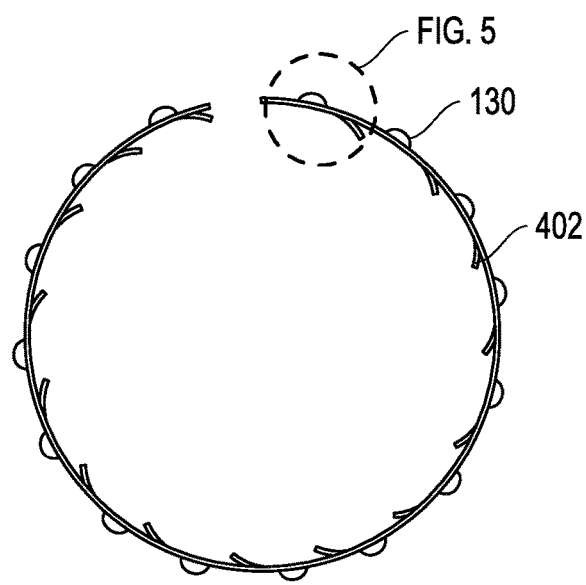
FIG. 4B includes a cross-sectional view of a tolerance ring in accordance with the second embodiment.

Referring now to FIGS. 4A and 4B, an exemplary tolerance ring is illustrated includes the same elements as shown in FIGS. 1A through 3B, with one exception. As shown in FIG. 4A, extensions 402 are located between wave structures 130. The extensions 402 protrude radially in a direction opposite to the direction of adjacent wave structures. As shown in FIG. 4A, the wave structures 130 can be separated from extensions 402 by undeformed regions 424.

Figure 5:
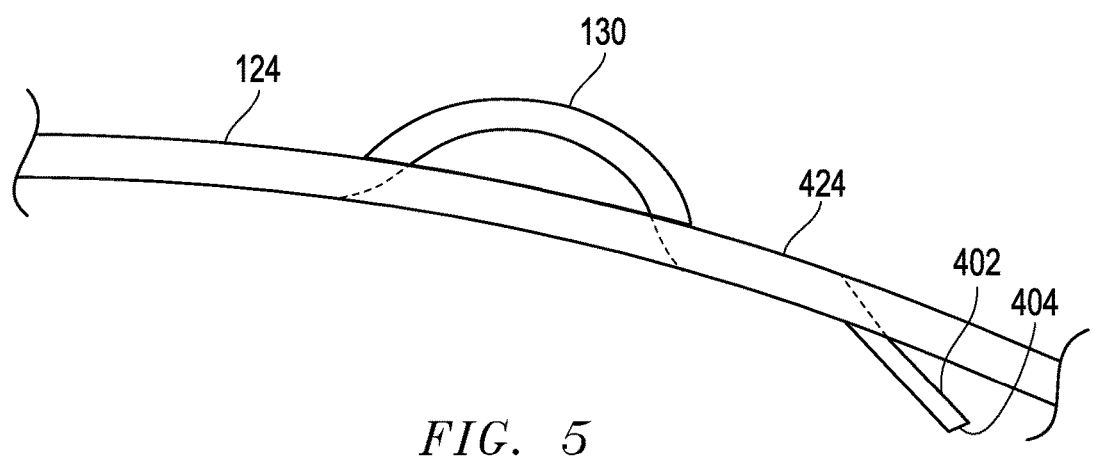
FIG. 5 includes a partial cross-sectional view of a wave structure of a tolerance ring in accordance with the second embodiment.

In yet another embodiment and as shown in FIG. 5, the extensions 402 can have a terminating edge 404. Edge 404 can be disconnected from the undeformed portion 424. Alternatively (not shown in the FIG. 5), edge 404 can be connected to portion 424.

Figure 6A:
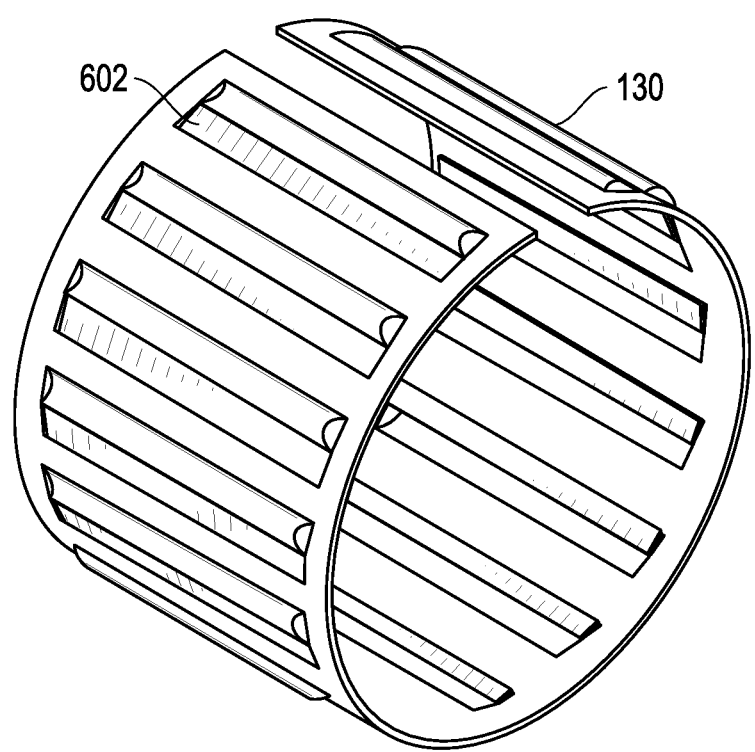
FIG. 6A includes a perspective view of a tolerance ring in accordance with a third embodiment.
Figure 6B:
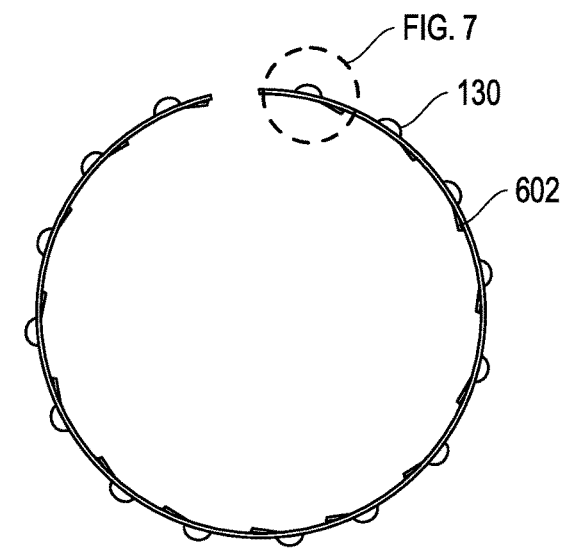
FIG. 6B includes a cross-sectional view of a tolerance ring in accordance with the third embodiment.
Figure 7:
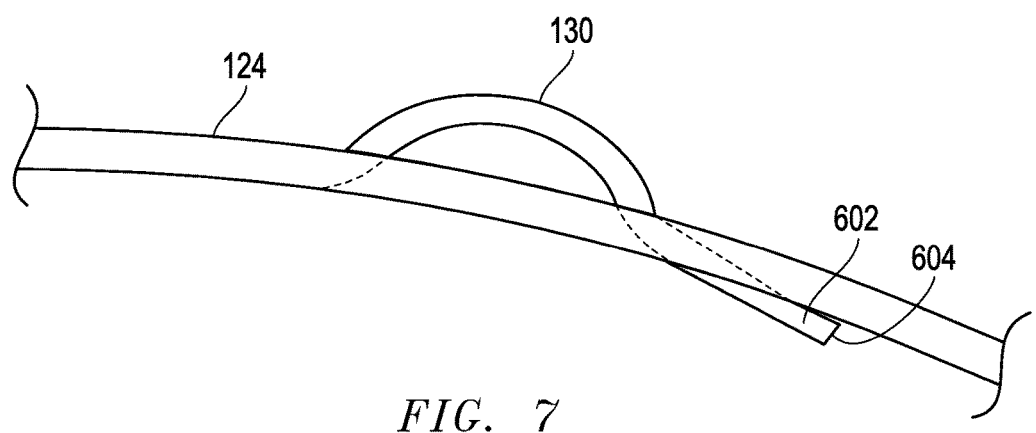
FIG. 7 includes a partial cross-sectional view of a wave structure of a tolerance ring in accordance with the third embodiment.

In yet another embodiment, the extensions are not separated from an adjacent wave structure 130 by an undeformed region as shown in FIG. 6. Here, the extensions 602 are connected to an adjacent wave structure 130. As shown in FIG. 7, the extensions 602 can include a terminating edge 604, which can be disconnected from the undeformed portion 624. Alternatively (and not shown), the terminating edge can remain connected from the undeformed sidewall portion 624.

As shown in FIG. 1B, the tolerance ring 100 can be utilized in an assembly that includes an outer component 304 that has a bore formed within the outer component 304 and an inner component 302 disposed within the bore. The outer component 304 can be a housing formed with a bore and the inner component 302 can be a rack shaft bearing. Further, the tolerance ring 100 can be mounted between the inner component 302 and the outer component 304.

In one embodiment, the inner component can have a surface structure that engages with the extensions 402 or 602. In a particular embodiment, such surface structure can be congruent with the inner surface of the tolerance ring when assembled. For example, the inner component can have grooves, notches, or indentations. In yet one particular embodiment, the indentations can have a V-shaped cross-section. In another embodiment, the cross-section of the inner component can have U-shaped indentations, L-shaped indentations, J-shaped indentations, or any combination thereof.

In a particular aspect, a tolerance ring 100 described herein can be made from a metal, a metal alloy, or a combination thereof. The metal can include a ferrous metal. Further, the metal can include steel. The steel can include stainless steel, such as austenitic stainless steel. Moreover, the steel can include stainless steel comprising chrome, nickel, or a combination thereof. For example, the steel can X10CrNi18-8 1.4310 stainless steel. Further, the tolerance ring can include a Vickers pyramid number hardness, VPN, which can be ≥350, such as ≥375, ≥400, ≥425, or ≥450. VPN can also be ≤600, ≤500, ≤475, or ≤450. VPN can also be within a range between, and including, any of the VPN values described herein. In another aspect, the tolerance ring can be treated to increase its corrosion resistance. In particular, the tolerance ring can be passivated. For example, the tolerance ring can be passivated according to the ASTM standard A967.

In one particular embodiment, the inner component is made of a material having a $VPN_{IC}$ less than the tolerance ring $VPN_{TR}$, i.e. $VPN_{IC}<VPN_{TR}$. Accordingly, the tolerance ring is of a harder material than the inner component. As a result, for tolerance rings comprising inward extensions 402 or 602, the terminating edges 404 or 604 can emboss indentations into the mating surface of the inner component upon assembly.

In another aspect, the stock material from which the tolerance ring 100 can be formed can have a thickness, T, and T can be ≥0.1 mm, such as ≥0.2 mm, ≥0.3 mm, ≥0.4 mm, ≥0.5 mm, or ≥0.6 mm. In another aspect, T can be ≤1.0 mm, ≤0.9 mm, or ≤0.8 mm. Moreover, T can be within a range between, and including, any of the values of T disclosed above.

The tolerance ring 100 may have an overall outer diameter, OD, and OD can be ≥37.5 mm, such as ≥40 mm, ≥45 mm, ≥50 mm, ≥55 mm, or ≥60 mm. The OD can be ≤37.5 mm, such as ≤35 mm, or ≤30 mm. Further, OD can be within a range between and including any of the values of OD described herein.

In another aspect, the tolerance ring can have an overall length, L, and L can be ≥233 mm, ≥235 mm, ≥240 mm, ≥250 mm, or ≥260 mm. L can be ≤233 mm, such as ≤230 mm, ≤225 mm, ≤220 mm, or ≤210 mm. Moreover, L can be within a range between, and including, any of the values of L described above.

Summarizing the present disclosure, but not limiting the content, the following items are included:

Item 1. A tolerance ring adapted to be deployed between inner and outer components, comprising:
a generally cylindrical body having a central axis and a sidewall that defines a first axial end and a second axial end,
wherein the sidewall includes:
an undeformed portion; and
a plurality of wave structures protruding radially from the undeformed portion,
wherein the tolerance ring is adapted to have a first torque break-point $T_1$ in a first rotational direction and a second torque break point $T_2$ in a second rotational direction opposite to the first rotational direction, wherein a ratio of $T_1/T_2>1$.

Item 2. An assembly, comprising:
an outer component including a bore;
an inner component disposed within the bore; and
a tolerance ring mounted between the inner component and the outer component,
the tolerance ring comprising:
a generally cylindrical body having a central axis and a sidewall that defines a first axial end and a second axial end,
wherein the sidewall includes:
an undeformed portion; and
a plurality of wave structures protruding radially from the undeformed portion,
wherein the tolerance ring is adapted to have a first torque break-point $T_1$ in a first rotational direction and a second torque break point $T_2$ in a second rotational direction opposite to the first rotational direction, wherein a ratio of $T_1/T_2>1$.

Item 3. A method of dividing torque transmission, the method comprising
providing an assembly, the assembly comprising
an outer component including a bore,
an inner component disposed within the bore, and
a tolerance ring mounted between the inner component and the outer component,
the tolerance ring comprising
a generally cylindrical body having a central axis and a sidewall that defines a first axial end and a second axial end, wherein the sidewall includes an undeformed portion; and a plurality of wave structures protruding radially from the undeformed portion; and
applying torque about the central axis to the inner or the outer component in a first rotational direction, wherein the torque break point in the first rotational direction $T_1$ is different A skilled artisan may recognize other applications that may utilize a tolerance ring having one or more of the characteristics described herein.

Item 4. The tolerance ring, the assembly, or the method of any one of the preceding items, further comprising a gap extending along the entire axial length of the body, wherein the gap establishes a split in the body.

Item 5. The tolerance ring, the assembly, or the method of any one of the preceding items, wherein each wave structure has an asymmetric cross-section as viewed in a plane perpendicular to the central axis.

Item 6. The tolerance ring, the assembly, or the method according to item 5, wherein a radial line bisecting the asymmetric cross-section divides the cross-section into a first arc and a second arc.

Item 7. The tolerance ring, the assembly, or the method according to item 6, wherein the first arc has an absolute value of a first tangential slope $s_1$ at a mid-point $MP_1$ and the second arc has an absolute value of a second tangential slope $s_2$ at a mid-point $MP_2$, and $|s_1| \neq |s_2|$.

Item 8. The tolerance ring, the assembly, or the method according to item 7, wherein a ratio of $|s_2|/|s_1|$ is greater than 1, such as greater than 1.1, greater than 1.2, greater than 1.4, greater than 1.8, greater than 2.0, greater than 2.5, or greater than 3.0, but not greater than 20.

Item 9. The tolerance ring, the assembly, or the method of any one of the preceding items, wherein each wave structure protrudes in a first radial direction, the tolerance ring further comprising a plurality of extensions, each extension protruding in a second radial direction opposite to the first radial direction.

Item 10. The tolerance ring, the assembly, or the method of according to item 9, wherein the extension further includes a terminating edge, the terminating edge disconnected from the side wall.

Item 11. The tolerance ring, the assembly, or the method according to item 10, wherein the terminating edge is adapted to frictionally engage the inner or the outer component so as to provide an increase of $T_1/T_2$.

Item 12. The tolerance ring, the assembly, or the method according to item 11, wherein the increase of $T_1/T_2$ is at least 0.05, such as at least 0.1, at least 0.2, at least 0.5, at least 0.7, at least 1, at least 2, at least 10, at least 20, at least 30, or at least 50, but not greater than 1000.

Item 13. The tolerance ring, the assembly, or the method according to item 9, wherein each extension extends from a lateral side of a respective wave structure, wherein the extension and the lateral side of respective wave structures are disconnected form the sidewall.

Item 14. The tolerance ring, the assembly, or the method according to item 9, wherein the inner or outer component further include a structured surface adapted to receive the extensions.

Item 15. The tolerance ring, the assembly, or the method according to item 14, wherein a cross-section of the structured surface of the inner or the outer component as viewed in a plane perpendicular to the central axis includes V-shaped indentations, U-shaped indentations, L-shaped indentations, J-shaped indentations, or any combination thereof.

Item 16. The tolerance ring, the assembly, or the method of any one of the preceding items, wherein the ratio of $T_1/T_2$ is greater than 1.05, such as greater than 1.1, greater than 1.2, greater than 1.5, greater than 2, greater than 5, greater than 10, greater than 15, greater than 20, greater than 30, greater than 50, greater than 70, greater than 100, but not greater than 1000.

Item 17. The tolerance ring, the assembly, or the method of any one of the preceding items, wherein the tolerance ring comprises carbon steel, stainless steel, spring steel, inconel, monel, incalloy, phynox, or copper-beryllium.

Item 18. The tolerance ring, the assembly, or the method of any one of the preceding items, wherein the tolerance ring has a Vickers hardness HV of at least 50, such as at least 55, at least 60, at least 65, at least 70, at least 75, at least 80, at least 85, at least 90, at least 95, at least 100, at least 110, at least 115, at least 120, at least 125, at least 130, at least 135, at least 140, at least 145, at least 150, at least 160, at least 170, at least 180, at least 190, or at least 200.

Item 19. The tolerance ring, the assembly, or the method of any one of the preceding items, wherein the tolerance ring has a Vickers hardness HV of not greater than 600, such as not greater than 550, not greater than 500, not greater than 450, not greater than 400, not greater than 350, not greater than 300, or not greater than 250.

Item 20. The tolerance ring, the assembly, or the method of any one of the preceding items, wherein the tolerance ring has a Vickers hardness $HV_{TR}$ and the inner component has a Vickers hardness $HV_{IC}$, wherein $HV_{TR}/HV_{IC}>1$.

Item 21. The tolerance ring, the assembly, or the method according to item 20, wherein $HV_{TR}/HV_{IC}$ is greater than 1.05, such as greater than 1.1, greater than 1.2, greater than 1.3, greater than 1.4, greater than 1.5, greater than 1.6, greater than 1.7, greater than 1.8, greater than 1.9, greater than 2.0, greater than 2.5, or greater than 3, but not greater than 30.

Item 22. The tolerance ring, the assembly, or the method of any one of the preceding items, wherein the tolerance ring has a Vickers hardness $HV_{TR}$ and the outer component has a Vickers hardness $HV_{OC}$, wherein $HV_{TR}/HV_{OC}>1$.

Item 23. The tolerance ring, the assembly, or the method according to item 22, wherein $HV_{TR}/HV_{OC}$ is greater than 1.05, such as greater than 1.1, greater than 1.2, greater than 1.3, greater than 1.4, greater than 1.5, greater than 1.6, greater than 1.7, greater than 1.8, greater than 1.9, greater than 2.0, greater than 2.5, or greater than 3, but not greater than 30.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

In addition, in the foregoing Detailed Description, various features can be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter can be directed to less than all features of any of the disclosed embodiments. Thus, the following claims are incorporated into the Detailed Description, with each claim standing on its own as defining separately claimed subject matter.

What is claimed is:

1. A tolerance ring adapted to be deployed between inner and outer components, comprising:
   a generally cylindrical body having a central axis and a sidewall that defines a first axial end and a second axial end,
   wherein the sidewall includes:
      an undeformed portion; and
      a plurality of wave structures protruding radially from the undeformed portion,
   wherein the tolerance ring is adapted to have a first torque break-point T1 in a first rotational direction and a second torque break point T2 in a second rotational direction opposite to the first rotational direction, wherein a ratio of T1/T2>1, wherein at least one wave structure has an asymmetric cross-section as viewed in a plane perpendicular to the central axis, wherein a radial line bisecting the asymmetric cross-section divides the asymmetric cross-section into a first arc and a second arc, wherein the first arc has an absolute value of a first tangential slope s1 at a mid-point MP1 and the second arc has an absolute value of a second tangential slope s2 at a mid-point MP2, and |s1|≠|s2|.

2. An assembly, comprising:
an outer component including a bore;
an inner component disposed within the bore; and
a tolerance ring mounted between the inner component and the outer component, the tolerance ring comprising:
a generally cylindrical body having a central axis and a sidewall that defines a first axial end and a second axial end,
wherein the sidewall includes:
an undeformed portion; and
a plurality of wave structures protruding radially from the undeformed portion,
wherein the tolerance ring is adapted to have a first torque break-point T1 in a first rotational direction and a second torque break point T2 in a second rotational direction opposite to the first rotational direction, wherein a ratio of T1/T2>1, wherein at least one wave structure has an asymmetric cross-section as viewed in a plane perpendicular to the central axis, wherein a radial line bisecting the asymmetric cross-section divides the asymmetric cross-section into a first arc and a second arc, wherein the first arc has an absolute value of a first tangential slope s1 at a mid-point MP1 and the second arc has an absolute value of a second tangential slope s2 at a mid-point MP2, and |s1|≠|s2|.

3. The tolerance ring of claim 1, further comprising a gap extending along the entire axial length of the generally cylindrical body, wherein the gap establishes a split in the generally cylindrical body.

4. The tolerance ring of claim 1, wherein each wave structure has an asymmetric cross-section as viewed in a plane perpendicular to the central axis.

5. The tolerance ring according to claim 1, wherein a ratio of $|s_2|/|s_1|$ is greater than 1.

6. The tolerance ring according to claim 1, wherein the ratio of $T_1/T_2$ is greater than 1.05.

7. The tolerance ring according to claim 1, wherein the tolerance ring comprises carbon steel, stainless steel, spring steel, inconel, monel, incalloy, phynox, or copper-beryllium.

8. A method of dividing torque transmission, the method comprising providing an assembly, the assembly comprising
an outer component including a bore,
an inner component disposed within the bore, and
a tolerance ring mounted between the inner component and the outer component, the tolerance ring comprising
a generally cylindrical body having a central axis and a sidewall that defines a first axial end and a second axial end, wherein the sidewall includes an undeformed portion; and a plurality of wave structures protruding radially from the undeformed portion; and applying torque about the central axis to the inner or the outer component in a first rotational direction, wherein the torque break point in the first rotational direction T1 is different from a torque break point T2 in a second rotational direction opposite to the first rotational direction, wherein at least one wave structure has an asymmetric cross-section as viewed in a plane perpendicular to the central axis, wherein a radial line bisecting the asymmetric cross-section divides the asymmetric cross-section into a first arc and a second arc, wherein the first arc has an absolute value of a first tangential slope s1 at a mid-point MP1 and the second arc has an absolute value of a second tangential slope s2 at a mid-point MP2, and |s1|≠|s2|, and wherein a ratio of |s2|/|s1| is greater than 1.

9. The tolerance ring of claim 2, further comprising a gap extending along the entire axial length of the generally cylindrical body, wherein the gap establishes a split in the generally cylindrical body.

10. The tolerance ring of claim 2, wherein each wave structure has an asymmetric cross-section as viewed in a plane perpendicular to the central axis.

11. The tolerance ring according to claim 2, wherein a ratio of $|s_2|/|s_1|$ is greater than 1.

12. The tolerance ring according to claim 2, wherein the ratio of $T_1/T_2$ is greater than 1.05.

13. The tolerance ring according to claim 2, wherein the tolerance ring comprises carbon steel, stainless steel, spring steel, inconel, monel, incalloy, phynox, or copper-beryllium.

14. The method of claim 8, wherein the tolerance ring further comprises a gap extending along the entire axial length of the generally cylindrical body, wherein the gap establishes a split in the generally cylindrical body.

15. The method of claim 8, wherein each wave structure has an asymmetric cross-section as viewed in a plane perpendicular to the central axis.

16. The method of claim 8, wherein a ratio of $|s_2|/|s_1|$ is greater than 1.

17. The method of claim 8, wherein the ratio of $T_1/T_2$ is greater than 1.05.

18. The method of claim 8, wherein the tolerance ring comprises carbon steel, stainless steel, spring steel, inconel, monel, incalloy, phynox, or copper-beryllium.

19. The assembly of claim 2, wherein a cross-section of a structured surface of the inner or the outer component as viewed in a plane perpendicular to the central axis includes V-shaped indentations, U-shaped indentations, L-shaped indentations, J-shaped indentations, or any combination thereof.

20. The method of claim 8, wherein a cross-section of a structured surface of the inner or the outer component as viewed in a plane perpendicular to the central axis includes V-shaped indentations, U-shaped indentations, L-shaped indentations, J-shaped indentations, or any combination thereof.

* * * * *

UNITED STATES PATENT AND TRADEMARK OFFICE
CERTIFICATE OF CORRECTION

PATENT NO. : 10,094,426 B2  
APPLICATION NO. : 14/314997  
DATED : October 9, 2018  
INVENTOR(S) : Andrew R. Slayne Page 1 of 2

It is certified that error appears in the above-identified patent and that said Letters Patent is hereby corrected as shown below:

In the Claims

Column 8, Claim 1, Line 62, delete "T1" and insert therefor --$T_1$--.

Column 8, Claim 1, Line 63, delete "T2" and insert therefor --$T_2$--.

Column 8, Claim 1, Line 65, delete "T1/T2>1" and insert therefor --$T_1/T_2>1$--.

Column 9, Claim 1, Line 4, delete "s1" and insert therefor --$s_1$--.

Column 9, Claim 1, Line 4, delete "MP1" and insert therefor --$MP_1$--.

Column 9, Claim 1, Line 6, delete "s2" and insert therefor --$s_2$--.

Column 9, Claim 1, Line 6, delete "MP2" and insert therefor --$MP_2$--.

Column 9, Claim 1, Line 6, delete "|s1| ≠ |s2|" and insert therefor --$|s_1| \neq |s_2|$--.

Column 9, Claim 2, Line 21, delete "T1" and insert therefor --$T_1$--.

Column 9, Claim 2, Line 22, delete "T2" and insert therefor --$T_2$--.

Column 9, Claim 2, Line 24, delete "T1/T2>1" and insert therefor --$T_1/T_2>1$--.

Column 9, Claim 2, Line 30, delete "s1" and insert therefor --$s_1$--.

Column 9, Claim 2, Line 30, delete "MP1" and insert therefor --$MP_1$--.

Column 9, Claim 2, Line 32, delete "s2" and insert therefor --$s_2$--.

Signed and Sealed this  
Twelfth Day of March, 2019

Andrei Iancu  
*Director of the United States Patent and Trademark Office*

CERTIFICATE OF CORRECTION (continued)
U.S. Pat. No. 10,094,426 B2

Column 9, Claim 2, Line 32, delete "MP2" and insert therefor --$MP_2$--.

Column 9, Claim 2, Line 32, delete "|s1| ≠ |s2|" and insert therefor --$|s_1| \neq |s_2|$--.

Column 10, Claim 8, Line 3, delete "T1" and insert therefor --$T_1$--.

Column 10, Claim 8, Line 4, delete "T2" and insert therefor --$T_2$--.

Column 10, Claim 8, Line 12, delete "s1" and insert therefor --$s_1$--.

Column 10, Claim 8, Line 12, delete "MP1" and insert therefor --$MP_1$--.

Column 10, Claim 8, Line 13, delete "s2" and insert therefor --$s_2$--.

Column 10, Claim 8, Line 14, delete "MP2" and insert therefor --$MP_2$--.

Column 10, Claim 8, Line 14, delete "|s1| ≠ |s2|" and insert therefor --$|s_1| \neq |s_2|$--.

Column 10, Claim 8, Line 15, delete "|s2|/|s1|" and insert therefor --$|s_2|/|s_1|$--.